(12) United States Patent
Bailey

(10) Patent No.: US 11,964,860 B2
(45) Date of Patent: Apr. 23, 2024

(54) SOLAR PANEL DIRECT-MOTION INSTALLATION APPARATUS

(71) Applicant: Bailey Specialty Cranes and Aerials, LLC, Muskego, WI (US)

(72) Inventor: Jeffrey H. Bailey, Waterford, WI (US)

(73) Assignee: Bailey Specialty Cranes and Aerials, LLC, Muskego, WI (US)

( * ) Notice: Subject to any disclaimer, the term of this patent is extended or adjusted under 35 U.S.C. 154(b) by 58 days.

(21) Appl. No.: 17/834,358

(22) Filed: Jun. 7, 2022

(65) Prior Publication Data

US 2022/0411245 A1    Dec. 29, 2022

Related U.S. Application Data

(60) Provisional application No. 63/208,252, filed on Jun. 8, 2021.

(51) Int. Cl.
*B66F 9/12* (2006.01)
*H02S 99/00* (2014.01)

(52) U.S. Cl.
CPC .............. *B66F 9/122* (2013.01); *H02S 99/00* (2013.01)

(58) Field of Classification Search
CPC .......... B66F 9/188; B66F 9/148; B66F 9/147; B66F 9/122; H02S 99/00
See application file for complete search history.

(56) References Cited

U.S. PATENT DOCUMENTS

| | | | |
|---|---|---|---|
| 8,839,500 B2 | 9/2014 | Potter et al. | |
| 9,352,941 B2 | 5/2016 | Wheeler et al. | |
| 9,708,139 B2 * | 7/2017 | Kamata | E04G 21/14 |
| 10,669,132 B2 | 6/2020 | Wheeler et al. | |
| 11,228,275 B2 | 1/2022 | Miller et al. | |
| 11,241,799 B2 | 2/2022 | Clemenzi et al. | |
| 11,245,353 B2 * | 2/2022 | Di Stefano | H02S 30/10 |
| 2012/0279069 A1 * | 11/2012 | Von Deylen | F24S 25/16 29/700 |
| 2013/0133172 A1 * | 5/2013 | Kiener | B60P 1/5433 414/539 |
| 2022/0069770 A1 * | 3/2022 | Shelton | H01L 31/18 |

* cited by examiner

*Primary Examiner* — Mark C Hageman
(74) *Attorney, Agent, or Firm* — Jansson Munger McKinley & Kirby Ltd.; Peter N. Jansson

(57) ABSTRACT

Apparatus for installing a solar panel array in parallel rows on panel support structure, as for solar farms, including a lift-and-place vehicle with characterizing features for moving between and along rows of support structure. Such vehicle includes a driven ground-engaging base, a lifting mast extending upwardly and in a fore/aft direction to define a panel-loading space therebeneath, a liftable trolley beam secured to the mast over the panel-loading space and extending laterally between adjacent rows, a traversing trolley movable along the beam, and a panel-placing carrier suspended from the trolley for up/down and lateral movement of carried panels. A panel-pallet vehicle is hitched to the lift-and-place vehicle, extends under the panel-loading space, and has a pallet carrier adjacent to the panel-loading space. Preferred embodiments include telescoping, tilting and angle adjustment of the mast, and the panel-placing carrier has panel supports movable between panel supporting and releasing orientations, and wireless control.

24 Claims, 13 Drawing Sheets

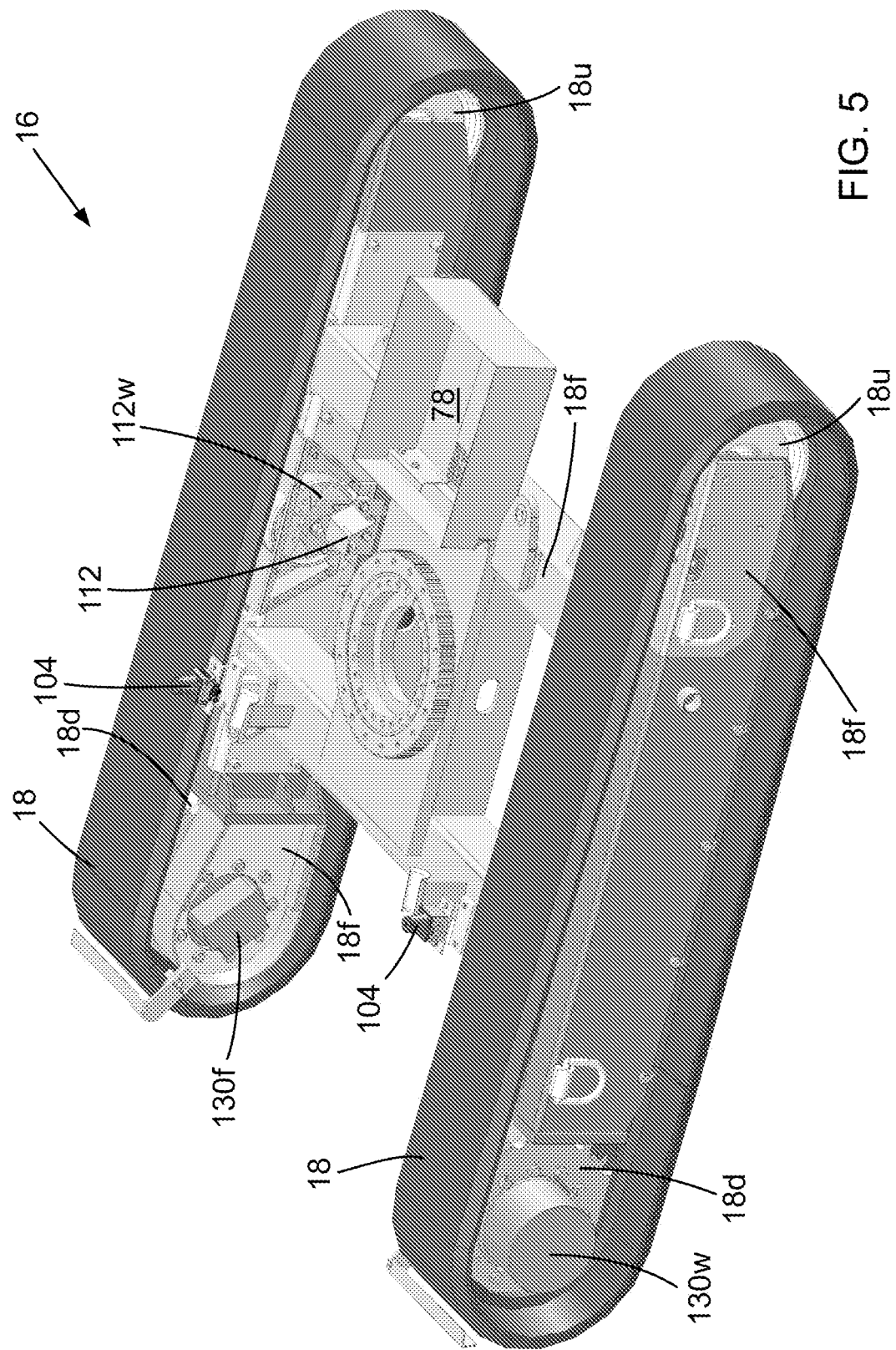

SOLAR PANEL DIRECT-MOTION INSTALLATION APPARATUS

RELATED APPLICATION

This application claims the benefit of provisional U.S. Patent Application Ser. No. 63/208,252, titled "Solar Panel Direct Motion Installation Machine," filed on Jun. 8, 2021 by the inventor of the present patent application. The entire contents of the provisional application is incorporated herein.

FIELD OF THE INVENTION

This invention relates to installation of large arrays of solar panels for what are often called solar farms, and in particular to apparatus facilitating efficient installation of panels despite task-imposed constraints.

BACKGROUND OF THE INVENTION

With the recent growth in demand for alternative and renewable energy, photovoltaic systems are increasingly relying on large arrays of solar panels of standard sizes located on geographic areas or plots solely used for that purpose. These utility-scale, grid-connected systems are often referred to as solar farms, solar parks or even solar power plants. (For such systems, we have chosen to use the term "solar farms" in this document.) As of 2021, solar farms were believed to be providing nearly 3% of utility-scale electricity generation in the United States.

Solar farms have huge numbers of solar panels often mounted in parallel rows on support structure secured to the ground. When panels are mounted and electrically interconnected, they deliver power to electronic power conditioning subsystems. The task of efficient panel mounting for large solar farms is daunting, particularly given the task-imposed constraints.

Among such constraints are: the absolute need to protect and not in any way damage either the light-receiving solar surfaces or the related heat-management and electrical components of such panels; the row-imposed limitations and the need for rapid panel mounting; weight and load issues; and the typical geography-imposed variations encountered. Of course, there are substantially parallel (whether linear or curved) rows of support structure on which the solar panels are mounted, but varying slopes and other up and down variations of the ground on which the support structure is secured as well as rough terrain, irregularities and variations of ground conditions between rows must be dealt with without compromising on the desired efficiency of array installation.

Some equipment has been developed to assist in the installation of solar panels of solar farms. For example, U.S. Pat. No. 11,228,275, titled "Methods and Apparatus for Installing Solar Panels" and assigned to National Oilwell Varco, LP of Houston, Texas, is prior art which discloses an approach for solar-panel installation in solar farms which includes: assembling multiple pre-assemblies of a plurality of solar panels (e.g., twelve panels, each in its own frame which is mounted on a central rail); transporting the multi-panel pre-assemblies to a solar-farm site; lifting (e.g., by an excavator) each pre-assembly onto posts and coupling first bearing housing portions to each of the posts supporting a multi-panel pre-assembly; supporting respective bearing subassemblies with the first bearing housing portions of each pre-assembly; and thereafter connecting a second bearing housing portion to each of the first housing portions.

Another example of prior art is the disclosure of U.S. Pat. No. 9,352,941, titled "Gantry Crane Vehicles and Methods for Photovoltaic Arrays" and assigned to Alion Energy, Inc. of Richmond, California Such patent discloses a gantry crane vehicle for performing one or more tasks (including installation) in a photovoltaic array. The gantry crane vehicle moves along a pre-laid set of rail structures installed on the ground of a solar farm and includes complex structure for handling and moving solar panels. The gantry vehicle is configured to install solar panels at the rear of the vehicle as defined by vehicle travel, not between rows of solar panels.

OBJECTS OF THE INVENTION

An object of this invention includes providing apparatus for efficient installation of arrays of solar panels for solar farms.

A related object of this invention is to facilitate rapid installation of solar panels of solar farms despite the many constraints imposed on installation as referred to above.

Another object of this invention is to provide solar-panel installation apparatus which readily accommodates typical variations, irregularities and anomalies encountered in the installation of arrays of solar panels of solar farms.

A further object of this invention is to minimize human exertion and load issues while speeding up panel installation.

These and other objects of the invention will be apparent from understanding the nature and characteristics of the apparatus of this invention.

SUMMARY OF THE INVENTION

This invention is apparatus for use in installation of an array of solar panels arranged in parallel rows on support structure. The installation apparatus includes an inventive lift-and-place vehicle powered to move between and along adjacent rows of the support structure. The lift-and-place vehicle includes: a base having a ground-engaging driver for movement along the ground; a lifting mast which is secured with respect to the base and extends upwardly and in a fore/aft direction to define a panel-loading space; a liftable trolley beam secured to the mast over the panel-loading space and extending laterally to span between the adjacent rows; a traversing trolley movable along the trolley beam; and a panel-placing carrier suspended from the trolley for up/down and lateral movement of panels carried thereby.

The solar-panel installation apparatus of this invention has various preferred embodiments with respect to elements of the inventive lift-and-place vehicle, and some of these will now be described.

In certain highly-preferred embodiments, the mast telescopes such that it is telescoping action which lifts and lowers the trolley beam, the trolley thereon, and the panel-placing carrier. The mast may have a main portion extending upwardly from the base to an upper portion which extends from the main portion to a position over the panel-loading space, and it is preferred that telescoping of the main portion of the mast serves to lift and lower the trolley beam, the trolley thereon, and the panel-placing carrier.

In some highly-preferred embodiments, the mast is rotatably secured with respect to the base for lateral tilting of the mast to control the angle of the trolley beam with respect to the ground. In some highly-preferred embodiments, the base includes a turret rotatably mounted on the ground-engaging driver, and the mast is mounted on the turret. The mast is, or most preferably also is, rotatably secured with respect to the base for rotation of the mast around a substantially vertical axis to control the angle of the trolley beam with respect to the fore/aft direction.

In some preferred embodiments, the panel-placing carrier includes panel supports for supporting a pair of opposing edges of solar panels, such panel supports being movable between panel-supporting and panel-releasing orientations. Preferably, such panel supports are configured to support left and right edges of solar panels, each panel support having a rotatable lip configured to be movably controlled between panel-supporting and panel-releasing orientations.

It is highly preferred that the ground-engaging driver of the base of the lift-and-place vehicle include endless tracks driven by drive wheels. It has been found that such a ground-engaging driver better accommodates the ground irregularities and varying ground conditions encountered between and along rows of support structure on which solar panels are being installed.

The solar-panel installation apparatus preferably has a controller apparatus with a user interface unit to control the functions of the apparatus, and a highly-preferred embodiment of the controller includes a wireless link to the user interface unit. In certain preferred embodiments of the solar-panel installation apparatus, the controller is a programmable controller having at least one predetermined frequently-used movement of one or more portions of the apparatus programmed therein. For example, the controller can be programmed for a drive-increment movement taking the entire apparatus forward the exact distance to position it for installation of the next solar panels. Movements of the other movable portions of the lift-and-place apparatus can also be programmed to facilitate panel installation steps.

In certain highly-preferred embodiments of the invention, the trolley beam is rotatably secured to the mast such that the trolley beam can be placed in a substantially fore/aft orientation to facilitate transport and storage.

In addition to such lift-and-place vehicle, highly preferred embodiments also include a panel-pallet vehicle which is hitched to the lift-and-place vehicle, extends under the panel-loading space, and has a pallet carrier adjacent to the panel-loading space. The panel-pallet vehicle is preferably configured to support the panel-placing carrier during loading of panels thereon. The pallet carrier of the panel-pallet vehicle preferably includes a fork-lift mechanism for engaging, lifting and carrying a pallet.

In certain highly-preferred embodiments, the solar-panel installation apparatus includes hydraulic and electrical tethers between the lift-and-place vehicle and the panel-pallet vehicle such that the panel-pallet vehicle, in addition to being movable by the lift-and-place vehicle to which it is hitched, is independently movable and steerable along the ground even while unhitched from the lift-and-place vehicle. It is also preferred that the removable hitching between the two vehicles include a hitching connection which includes two laterally-displaced hydraulic cylinders between the vehicles, such hydraulic cylinders being rotatably attached to at least one of the vehicles and being configured to be locked for fore/aft vehicle movement and unlocked for tight turning.

In certain highly-preferred embodiments, the solar-panel installation apparatus includes an optical sensor mounted on the panel-placing carrier to facilitate placement of the solar panels on the support structure, and some highly-preferred embodiments include one or more collision avoidance sensors.

The above-described solar panel installation apparatus has been shown to provide the above-mentioned objects of this invention, including improved efficiency of installation of arrays of solar panels for solar farms deemed so important to providing an increase in renewable energy. Rapid installation of solar panels of solar farms is achieved despite the many constraints imposed on installation, such as those referred to above. In particular, the solar-panel installation apparatus of this invention readily accommodates typical variations, irregularities and anomalies encountered during the installation of arrays of solar panels, and this is achieved while significantly reducing human exertion and load issues.

For clarity of certain terms used in this document, the following definitions are provided:

The term "parallel" as applied to rows of solar panels and/or to the rows of support structure to which solar panels are mounted includes but is not limited to linear parallelism. In other words, a pair of adjacent parallel rows could be either curved or linear (straight).

The term "support structure" refers to the row-forming structures secured to the ground, i.e., the structures on which and to which solar panels are placed and attached during the installation process.

The term "a fore/aft direction" refers to a single direction along a line generally parallel to the support structure and generally parallel to the direction the lift-and-place vehicle is traveling. Preferably, the direction of lift-and-place vehicle travel is such that the supply of panels to be installed, before being placed on the panel-placing carrier, is forward of the lift-and-place vehicle as defined by vehicle travel. The lift-and-place vehicle could be used to install solar panels by travel in the opposite direction, but such operation may create logistical issues with respect to convenient supply of panels to the lift-and-place vehicle.

The term "left and right edges" when used with respect to solar panels refers to their opposite lateral edges generally transverse to the path of vehicle travel.

The term "wireless link" of the controller refers to apparatus which communicates between a portion of the controller onboard the solar-panel installation apparatus and the user interface unit via radio, optical (including infrared), acoustic or other signals not requiring physical interconnection. Such systems are well-known to those skilled in this invention.

BRIEF DESCRIPTION OF THE DRAWING FIGURES

FIG. 5 is a grayscale perspective-view drawing of the ground-engaging driver embodiment of the solar-panel installation apparatus embodiment of FIG. 1.

DESCRIPTIONS OF PREFERRED EMBODIMENTS

Figure 1:
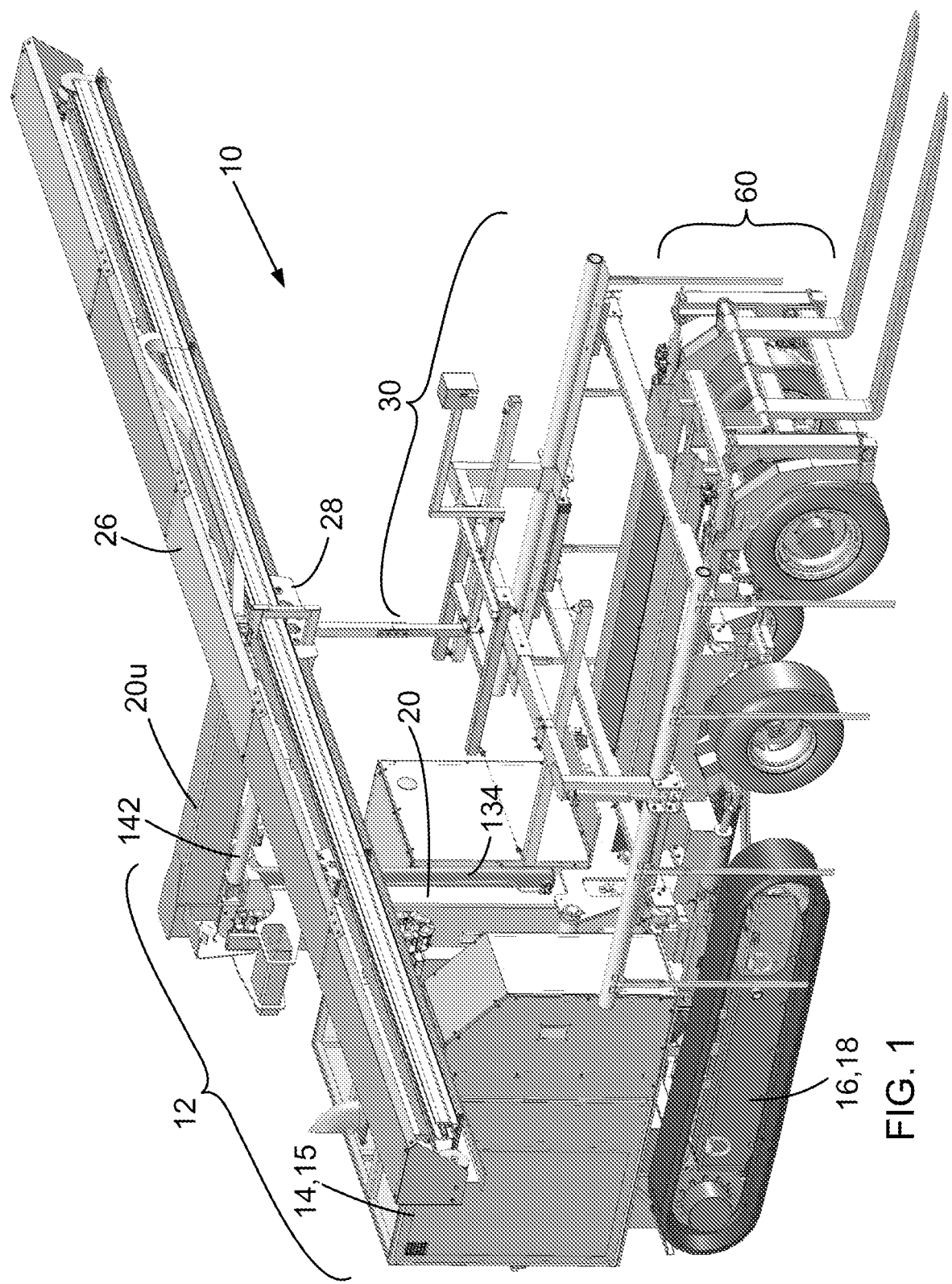
FIG. 1 is a grayscale perspective-view drawing of an embodiment of the solar-panel installation apparatus of this invention.
Figure 1A:
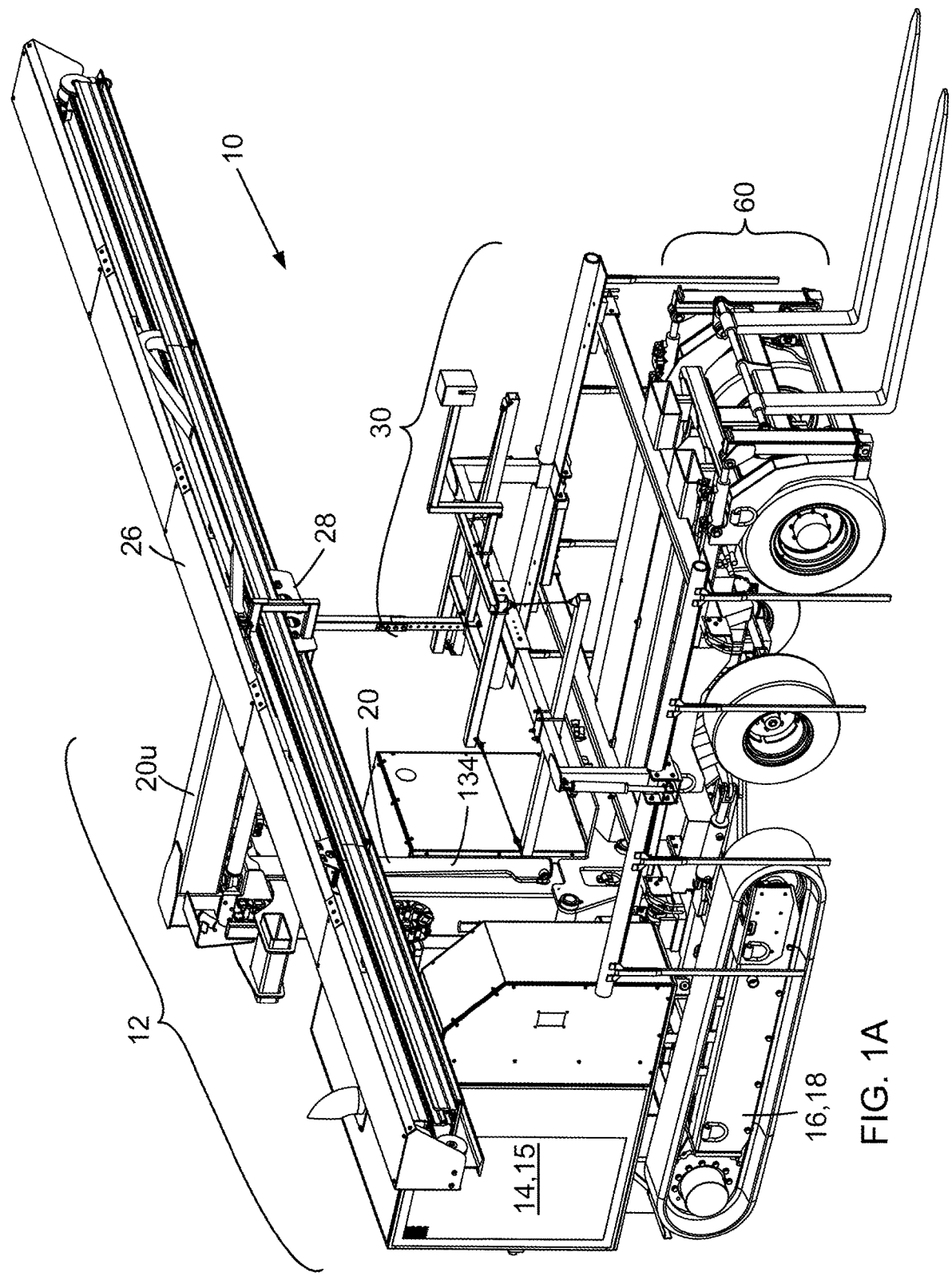
FIG. 1A is a perspective-view line drawing of the solar-panel installation apparatus embodiment of FIG. 1.
Figure 2:
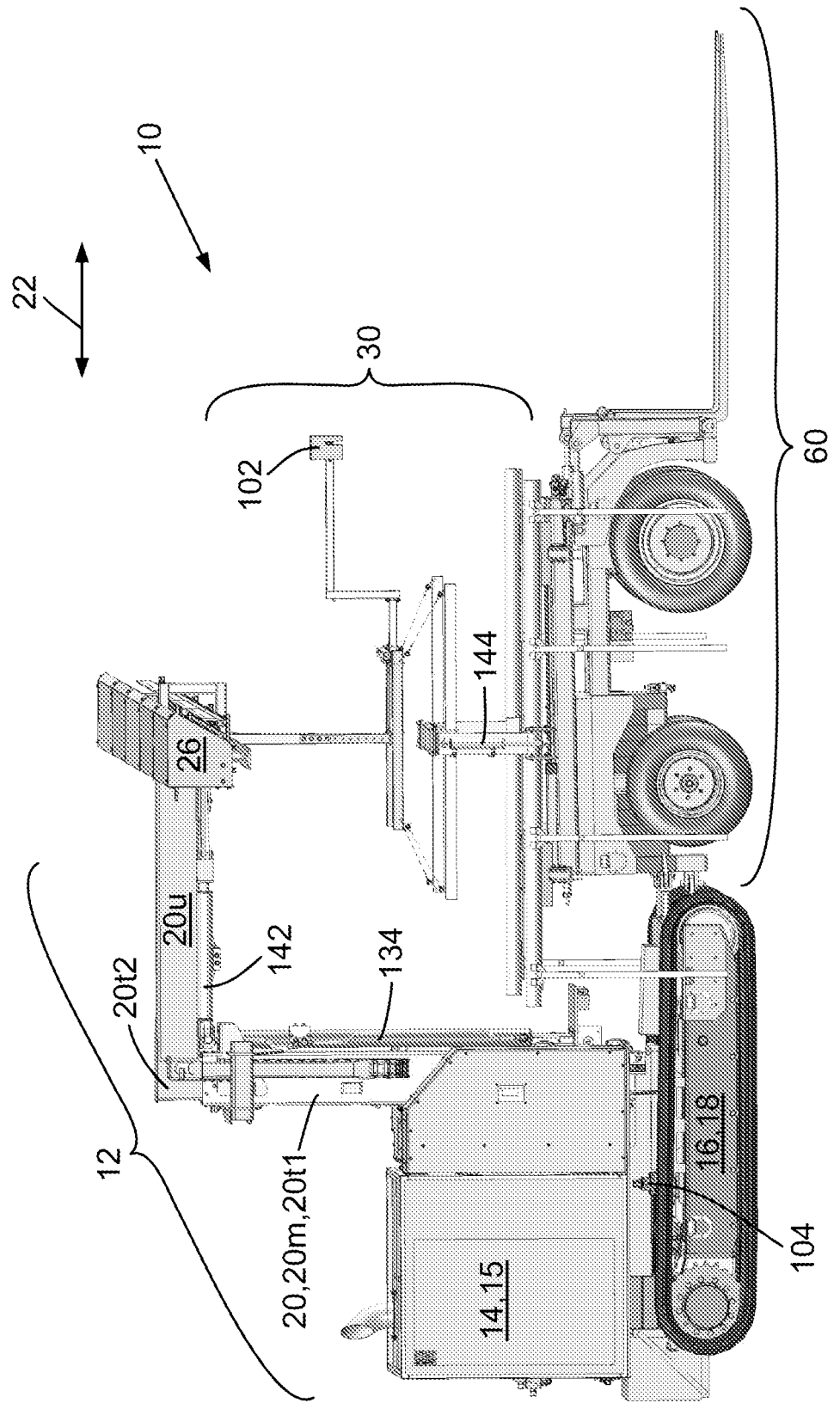
FIG. 2 is a grayscale side-view drawing of the solar-panel installation apparatus embodiment of FIG. 1.
Figure 2A:
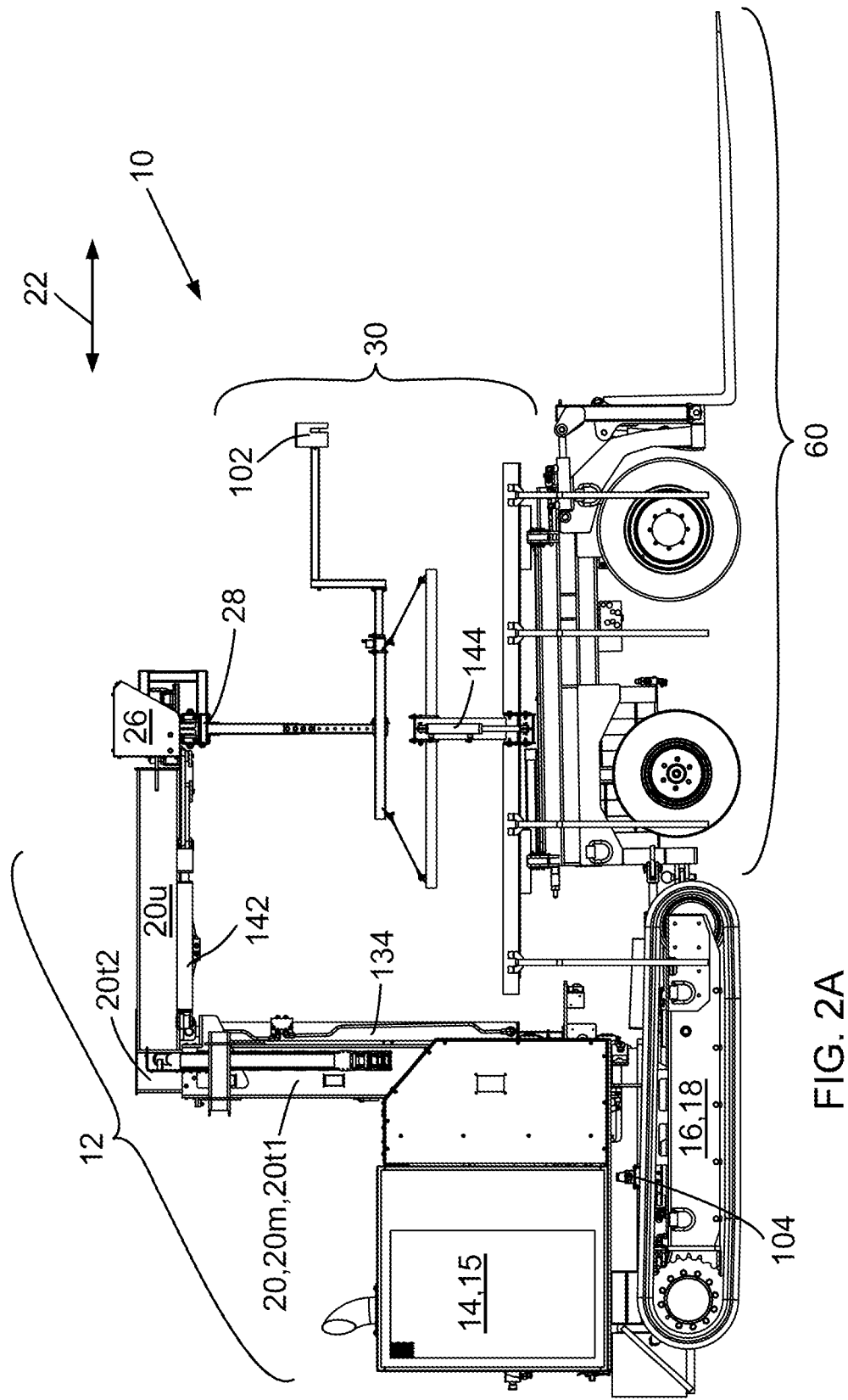
FIG. 2A is a side-view drawing of the solar-panel installation apparatus embodiment of FIG. 2.

FIGS. 1-4B and 5 are illustrations of a solar-panel installation apparatus 10 which is a preferred embodiment of this invention. (To reduce clutter and enhance clarity, not all reference numbers are found in each of these drawings.) FIGS. 1 and 1A illustrate apparatus 10 including a lift-and-place vehicle 12, and a panel-pallet vehicle 60 removably hitched to lift-and-place vehicle 12. Lift-and-place vehicle 12 includes a panel-placing carrier 30 for holding and moving one or more solar panels 32 to support structure 50 (see FIG. 7) of a solar farm (not shown). FIGS. 1, 2, 3, 4, and 5 are perspective grayscale drawings of various views of apparatus 10, lift-and-place vehicle 12, panel-placing carrier 30, and panel-pallet vehicle 60. FIGS. 1A, 2A, 3A, 4A, and 4B are line drawings of these views to assist in understanding the structure of inventive apparatus 10.

Lift-and-place vehicle 12 has a base 14 which includes a ground-engaging driver 16 for movement along the ground and a turret 15 rotatably mounted on ground-engaging driver 16. Referring to FIG. 5, driver 16 includes a track frame 18f and two tracks 18 (left and right) which are independently driven to enable apparatus to be steered along the ground or rotate without moving along the ground. Each track 18 has a track drive wheel 18d at the rear of track 18 and an undriven track wheel 18u at the front of track 18. Each drive wheel 18d is driven by a hydraulic motor 130 (see also FIG. 9), each of which includes a frame portion 130f secured to track frame 18f and a track wheel portion 130w secured to track drive wheel 18d. Each track 18 also includes a track-sensor wheel 112w and a rotational position sensor 112 to measure the distance traversed by its respective track 18.

Lift-and-place vehicle 12 also includes a lifting mast 20 which is secured to turret 15 and extends upwardly and in a fore/aft direction 22 (in this case, forward) to define a panel-loading space 24. Lifting mast 20 has a mast main portion 20m and a mast upper portion 20u. Mast main portion 20m includes a lower first telescoping portion 20t1 into which a second mast telescoping portion 20t2 is slidably attached in a telescoping fashion. Mast upper portion 20u extends forward from second telescoping portion 20t2 and supports a liftable trolley beam 26 along which a traversing trolley 28 is configured to move. Lifting mast 20 raises and lowers trolley beam 26 during the solar-panel installation operation of apparatus 10.

Lifting mast 20 is rotatably secured with respect to the turret 15 of base 14 for lateral tilting of mast 20 for lateral tilting of mast 20 in order to control the angle of trolley beam 26 with respect to the ground (angle 42, see FIG. 7, described later herein). In addition, trolley beam 26 is rotatably secured to mast upper portion 20u such that trolley beam 26 can be placed in a substantially fore/aft orientation (direction 22) to facilitate transport and storage. Hydraulic cylinder 142 is provided to achieve this transport and storage configuration.

A panel-placing carrier 30 is suspended from trolley 28, and carrier 30 is thus able to be moved from panel-loading space 24 to solar-panel support structure 50 with a variety of degrees-of-freedom of motion. Trolley beam 26 extends in both lateral directions (generally perpendicular to fore/aft direction 22) such that trolley beam 26 is able to reach beyond a distance 46 between adjacent rows of support structure 50 (see FIG. 7).

Figure 4:
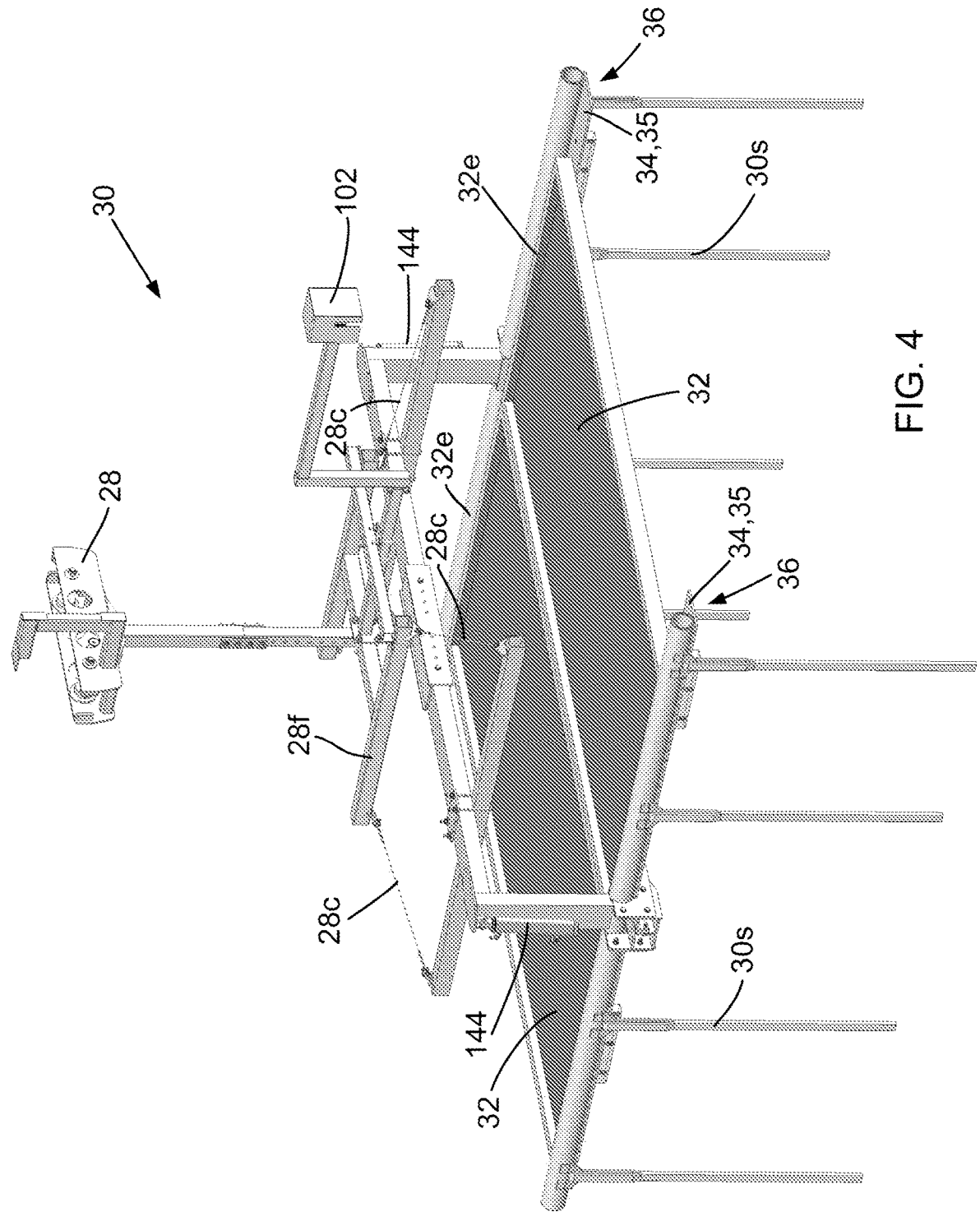
FIG. 4 is a grayscale perspective-view drawing of an embodiment of a panel-placing carrier attached to the traversing trolley of the solar-panel installation apparatus embodiment of FIG. 1. The panel-placing carrier is shown loaded with two solar panels ready for installation in an array of solar panels (not shown).
Figure 4A:
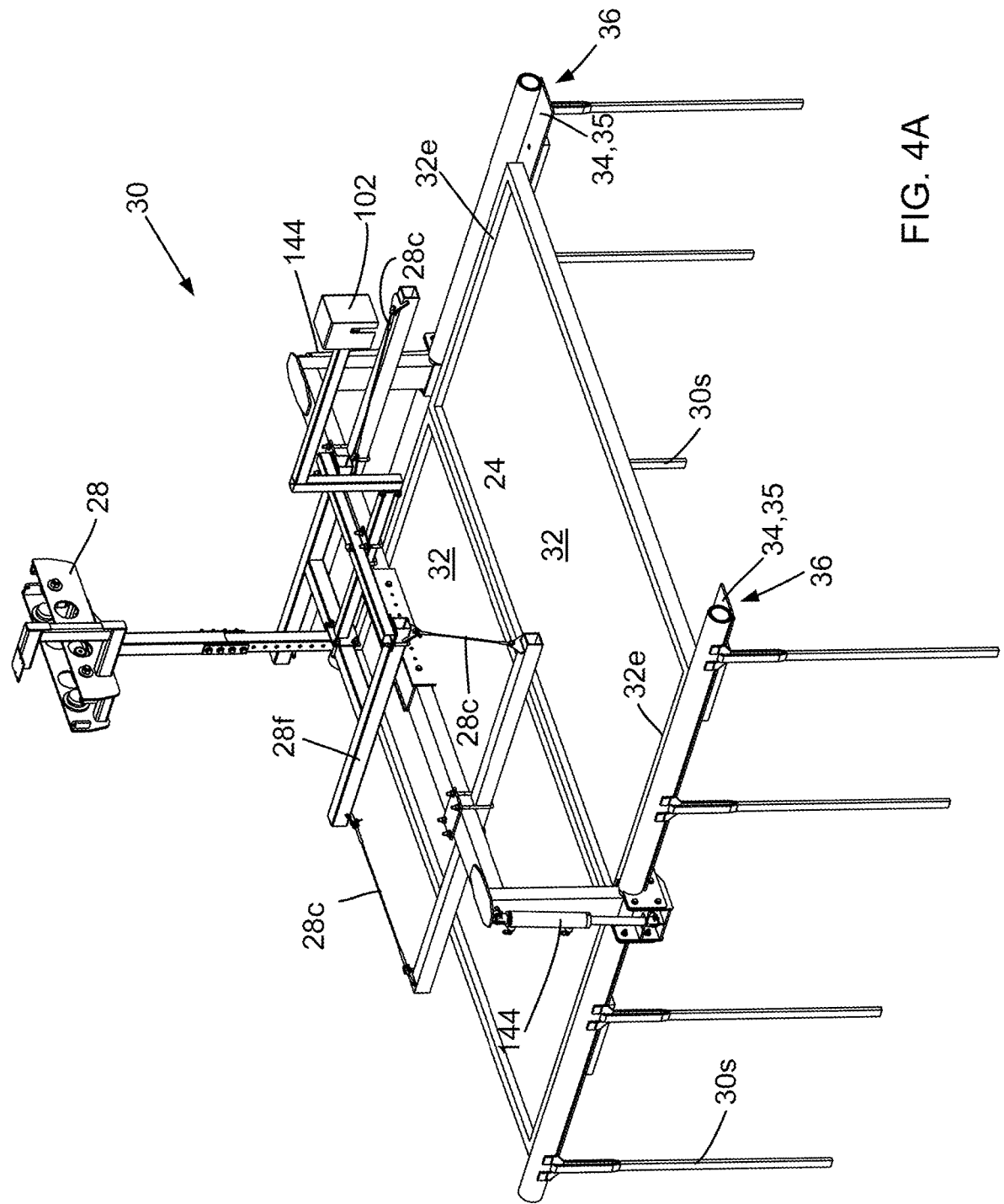
FIG. 4A is a perspective-view line drawing of the panel-loaded panel-placing carrier embodiment of FIG. 4. As in FIG. 4, the panel supports are in the panel-supporting orientation.
Figure 4B:
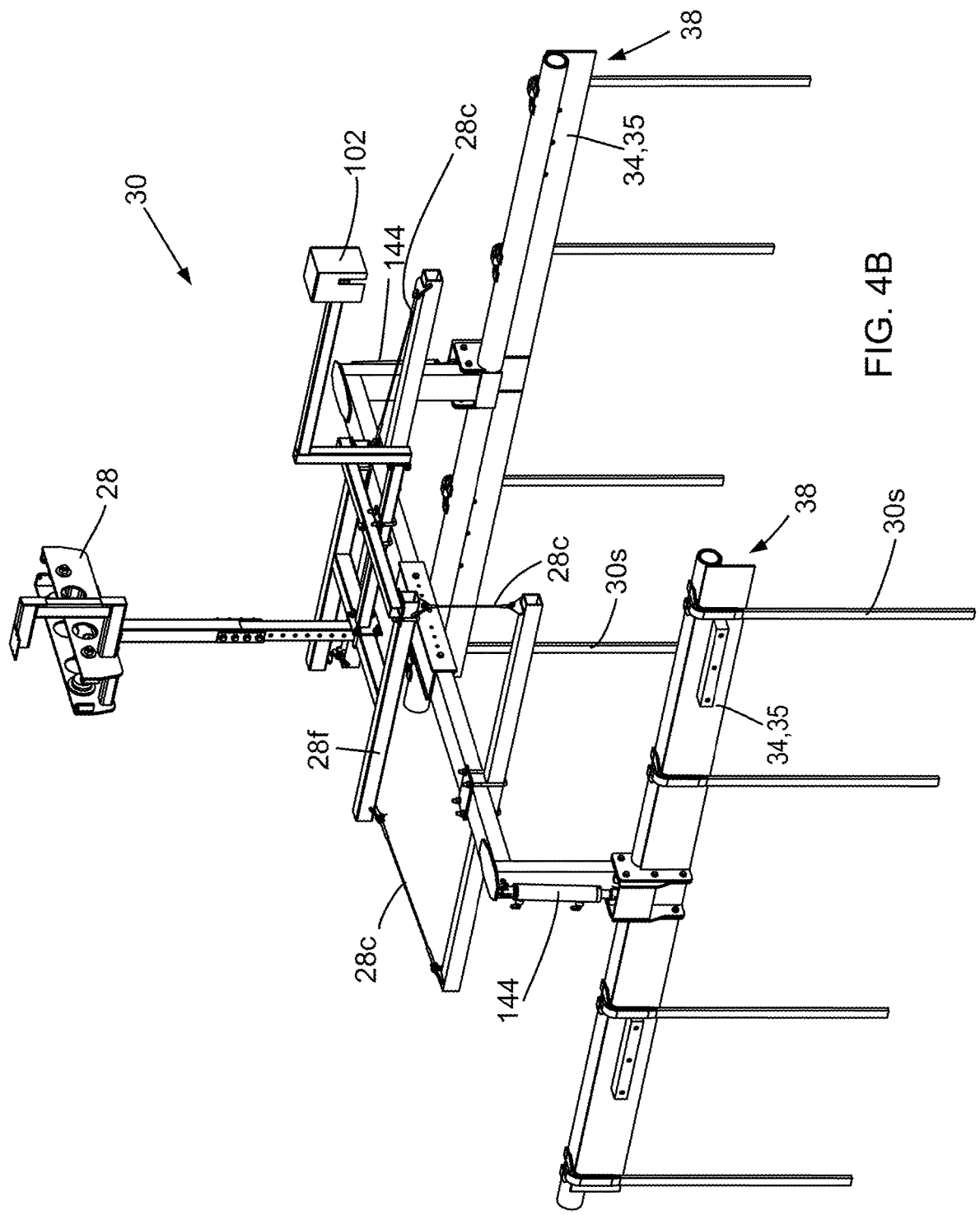
FIG. 4B is a perspective-view line drawing of the panel-placing carrier embodiment of FIG. 4 with the two solar panels no longer loaded thereon, and the panel supports in the panel-releasing orientation.

Panel-placing carrier 30 is suspended from a trolley 28 on a trolley frame 28f through four trolley cables 28c. Carrier 30 includes two panel supports 34, each of which has a panel-support rotatable lip 35 which rotates between a panel-supporting orientation 36 and a panel-releasing orientation 38. FIGS. 4 and 4A illustrate carrier 30 supporting two solar panels 32 by a pair of opposing solar-panel edges 32e with panel-support rotatable lip 35 in panel-supporting orientation 36; FIG. 4B illustrates carrier 30 having released two solar panels 32 with panel-support rotatable lip 35 in panel-releasing orientation 36.

Panel-placing carrier 30 also includes eight flexible carrier strips 30s (e.g., leather or fabric), four hanging from each panel support 34, to provide added indication to the operator of position and movement of carrier 30 as well as to serve as warnings to other personnel of the presence of carrier 30. (Only two carrier strips 30s are numbered in FIGS. 4-4B.)

Carrier 30 also includes an optical position sensor 102 to provide information to lift-and-place vehicle 12 and an operator via a controller 100 (discussed later herein) on the position of support structure 50.

Figure 3:
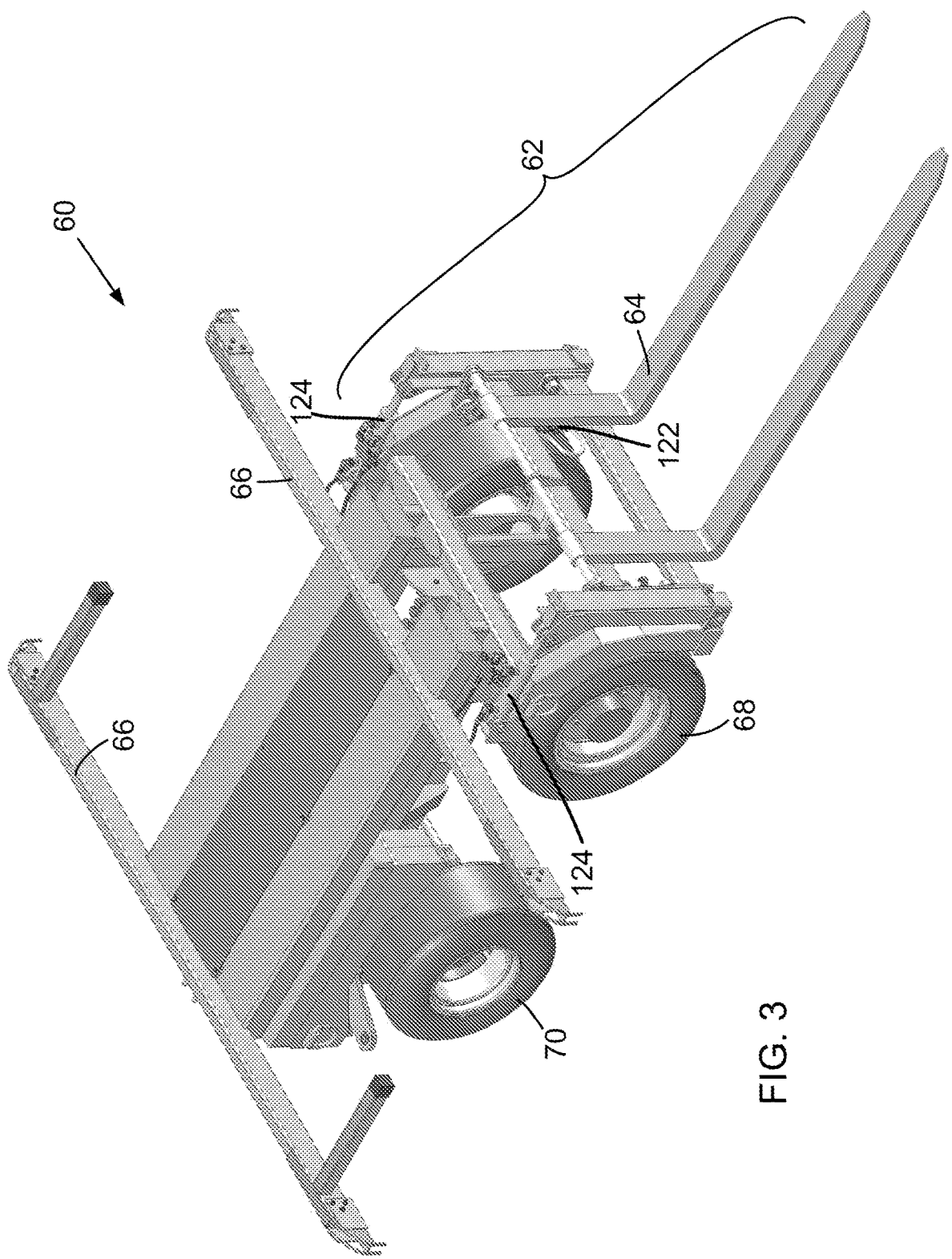
FIG. 3 is a grayscale perspective-view drawing of the panel-pallet vehicle of the solar-panel installation apparatus embodiment of FIG. 1.
Figure 3A:
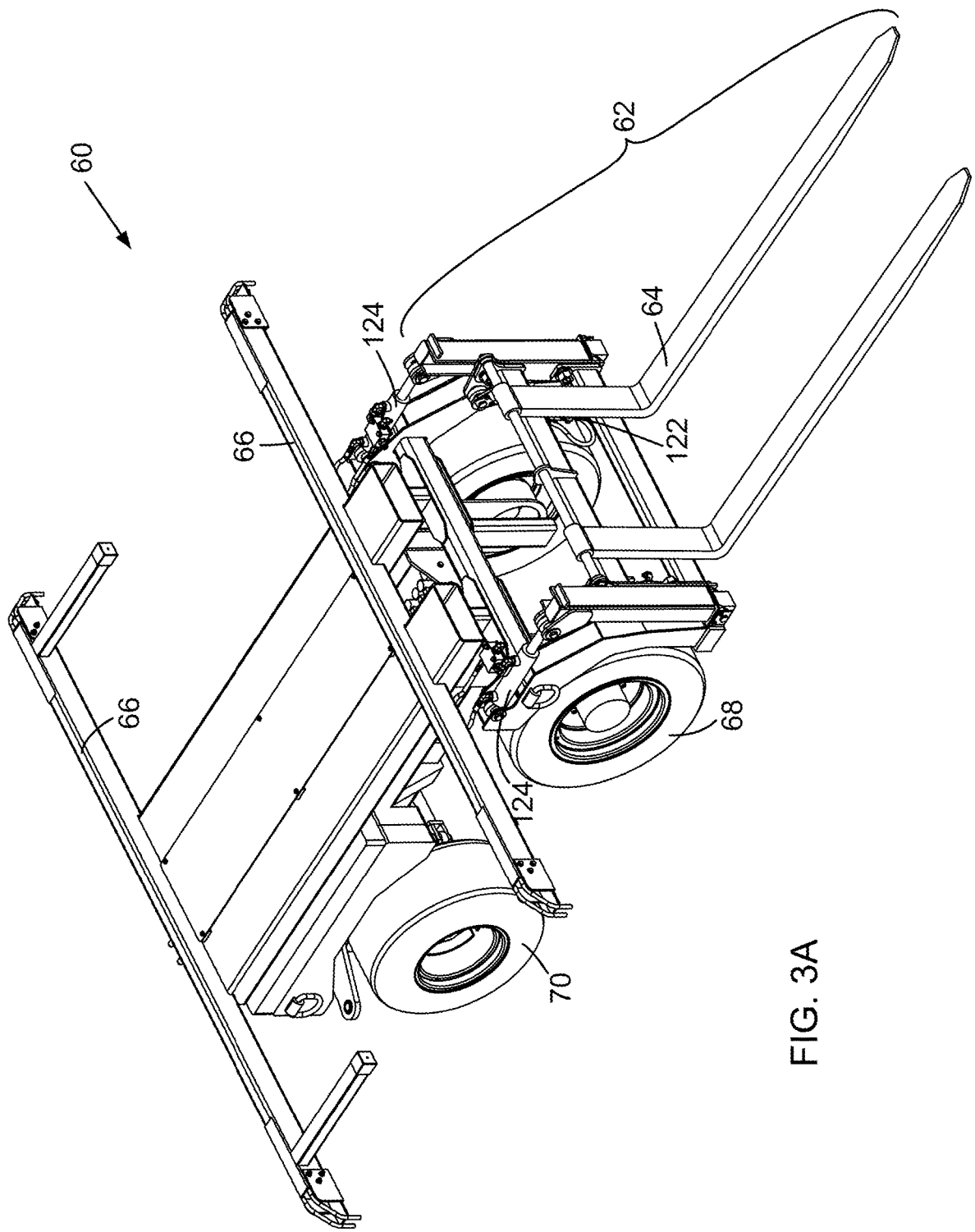
FIG. 3A is a perspective-view line drawing of the panel-pallet vehicle embodiment of FIG. 3.

When hitched via hitch 72 (see FIG. 6), panel-pallet vehicle 60 extends under panel-loading space 24. Referring now primarily to FIGS. 3 and 3A, panel-pallet vehicle 60 has a pallet carrier 62 adjacent to panel-loading space 24, and pallet carrier 62 includes a forklift 64 which is able to both lift and rotate a pallet of solar panels 32 for convenient positioning during transfer of solar panels 32 to panel-placing carrier 60 which during such transfer is supported by a carrier support 66 in panel-loading space 24. Such transfer is typically done manually.

Panel-pallet vehicle 60 includes two panel-pallet-vehicle drive wheels 68 at the front of vehicle 60 and two panel-pallet-vehicle steering wheels 70 at the rear of vehicle 60. Both drive and steering of vehicle 60 are provided hydraulically, steering via a hydraulic cylinder 126 and drive via two hydraulic motors 120. (See FIG. 9.) Forklift 64 is lifted via a hydraulic cylinder 122 and tilted via a hydraulic cylinder 124. (See also FIG. 9.)

Figure 6:
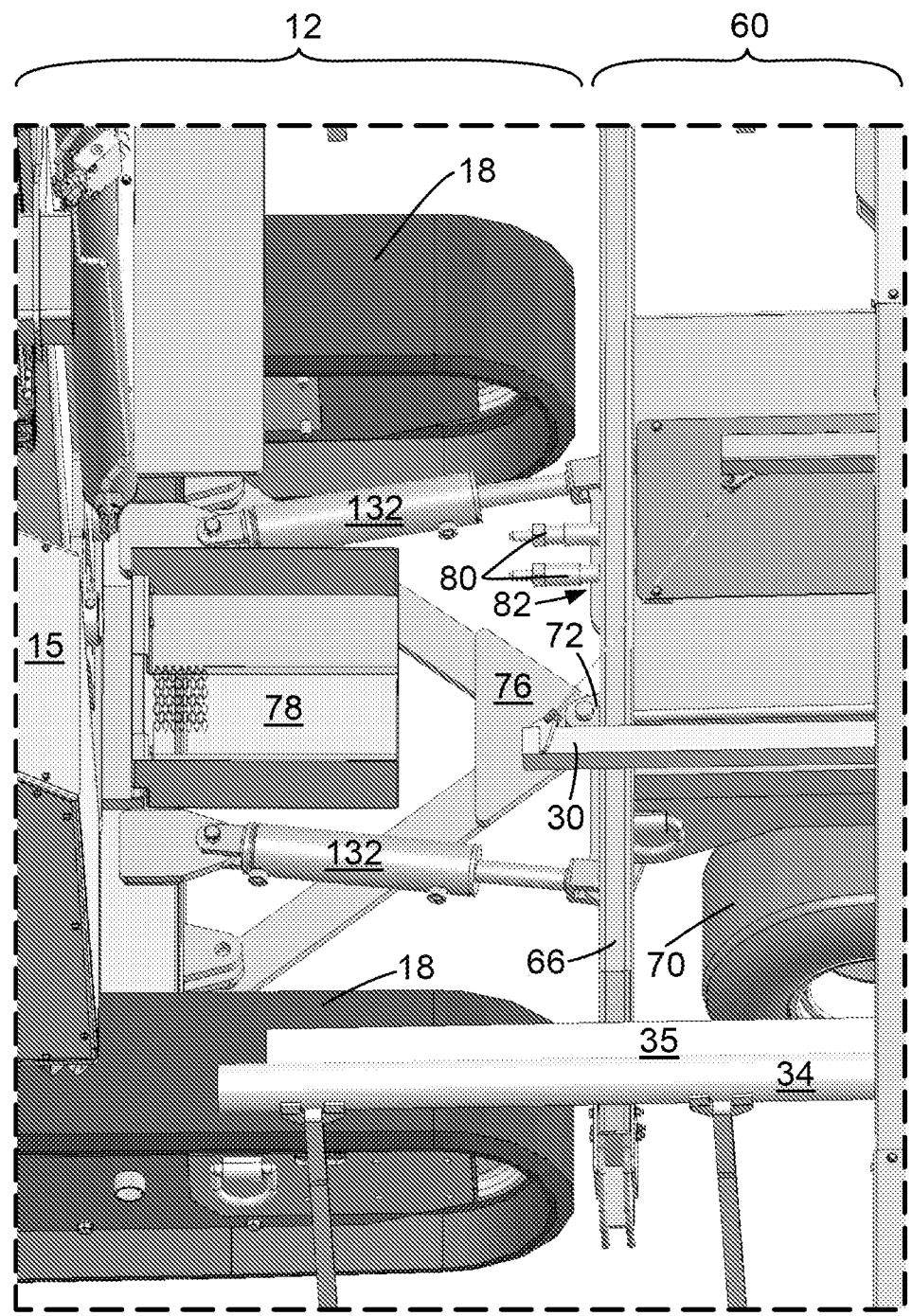
FIG. 6 is a partial grayscale perspective close-up top-view drawing of the hitch connecting the panel-pallet vehicle to the lift-and-place vehicle of the solar-panel installation apparatus embodiment of FIG. 1. The hitch includes two laterally-displaced hydraulic cylinders and a single-point tow mechanism between the vehicles.

FIG. 6 is a partial grayscale perspective close-up top-view drawing illustrating the hitching connection of panel-pallet vehicle 60 to lift-and-place vehicle 12. Such connection includes a single-point tow mechanism 76 on lift-and-place vehicle 12 removably attached to hitch 72 on panel-pallet vehicle 60. The hitching connection also includes two laterally-displaced hydraulic cylinders 132 rotatably attached to vehicles 12 and 60. Hydraulic cylinders 132 are configured such that together they are either locked for fore/aft movement of vehicle 12 and 60 or unlocked (pistons of cylinders 132 floating) for tight turning of vehicles 12 and 60. (See also FIG. 9.)

Panel-pallet vehicle 60 is tethered to lift-and-place vehicle 12 with three tethers (not shown) which include two hydraulic lines and a multi-conductor electrical cable, such tethers being connected to vehicle 60 at hydraulic line connectors 80 and electrical connector 82, respectively. While vehicle 60 is not tethered to vehicle 12, the tether lines are stowed in a tether basket 78 on vehicle 12. (See primarily FIGS. 5 and 6.)

Figure 7:
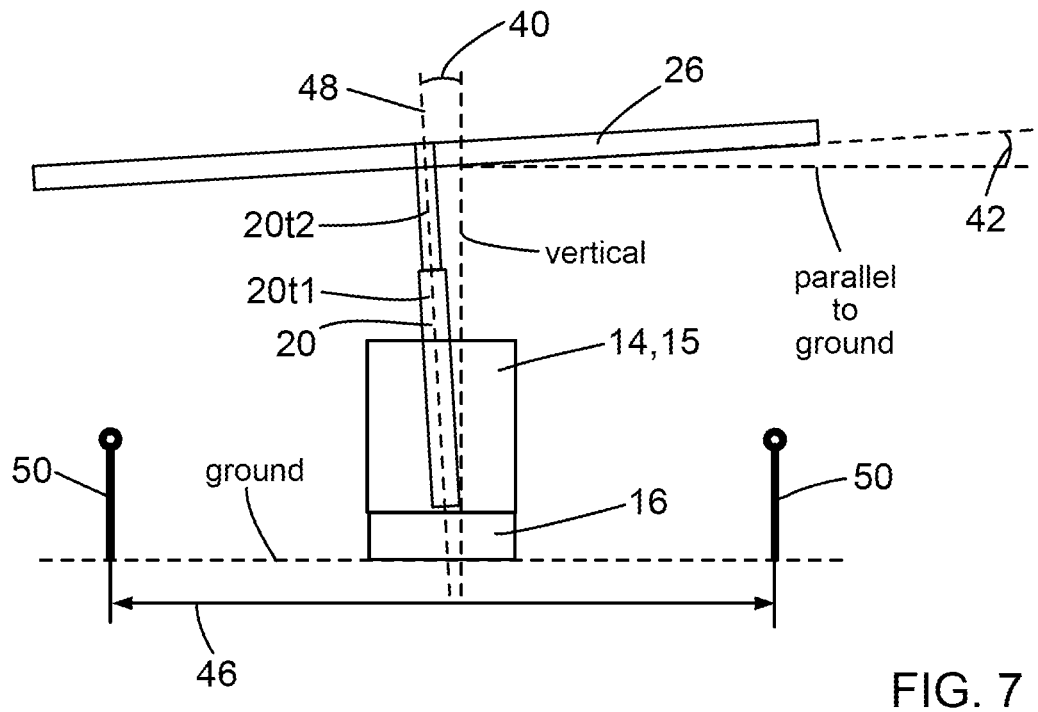
FIG. 7 is a highly-simplified schematic top-view representation of the embodiment of FIG. 1 with the fore/aft direction oriented into the page.
Figure 8:
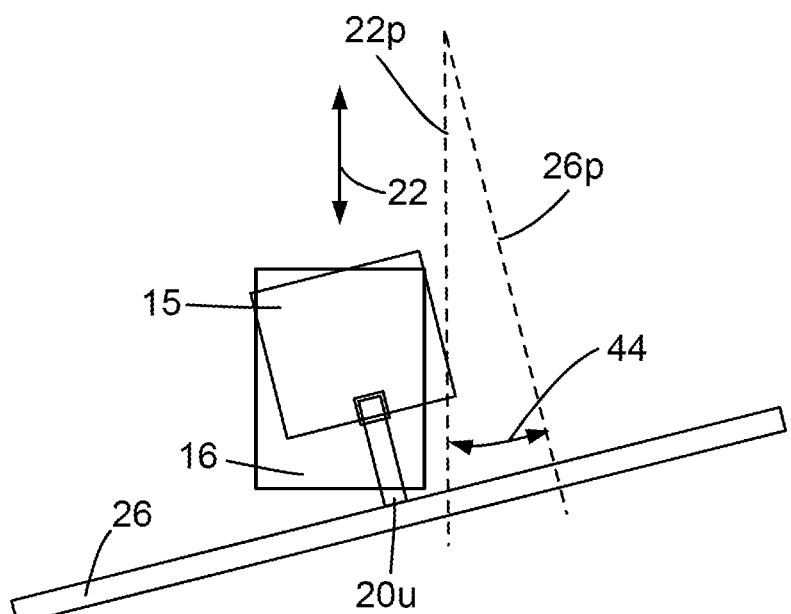
FIG. 8 is a highly-simplified schematic front-view representation of the embodiment of FIG. 1 with the fore/aft direction oriented as indicated.

FIGS. 7 and 8 illustrate in a simplified fashion some of the degrees-of-freedom of motion within the operation of lift-and-place vehicle 12. FIG. 7 is a front view illustrating vehicle 12 on the ground between two adjacent rows of solar-panel supports 50. The axis of mast 20 is indicated as axis 48, and the tilt of mast 20 with respect to turret 15 (and thus base 14) is shown as angle 40. The orientation of trolley beam 26 with respect to the ground is shown as angle 42; beam 26 orientation is established by both angle 42 and gravity. The ground is shown as being level in FIG. 7 by the indication of the reference line of angle 40 being vertical (as labeled), i.e., local vertical being aligned with gravity. (See also the description of FIG. 9 below.)

FIG. 8 illustrates vehicle 12 from above, and includes an angle 44 which is the angle between a line 22p parallel to fore/aft direction 22 and a line 26p perpendicular to trolley beam 26. In apparatus 10, angle 44 is influenced by the rotation of turret 15 with respect to driver 16.

Figure 9:
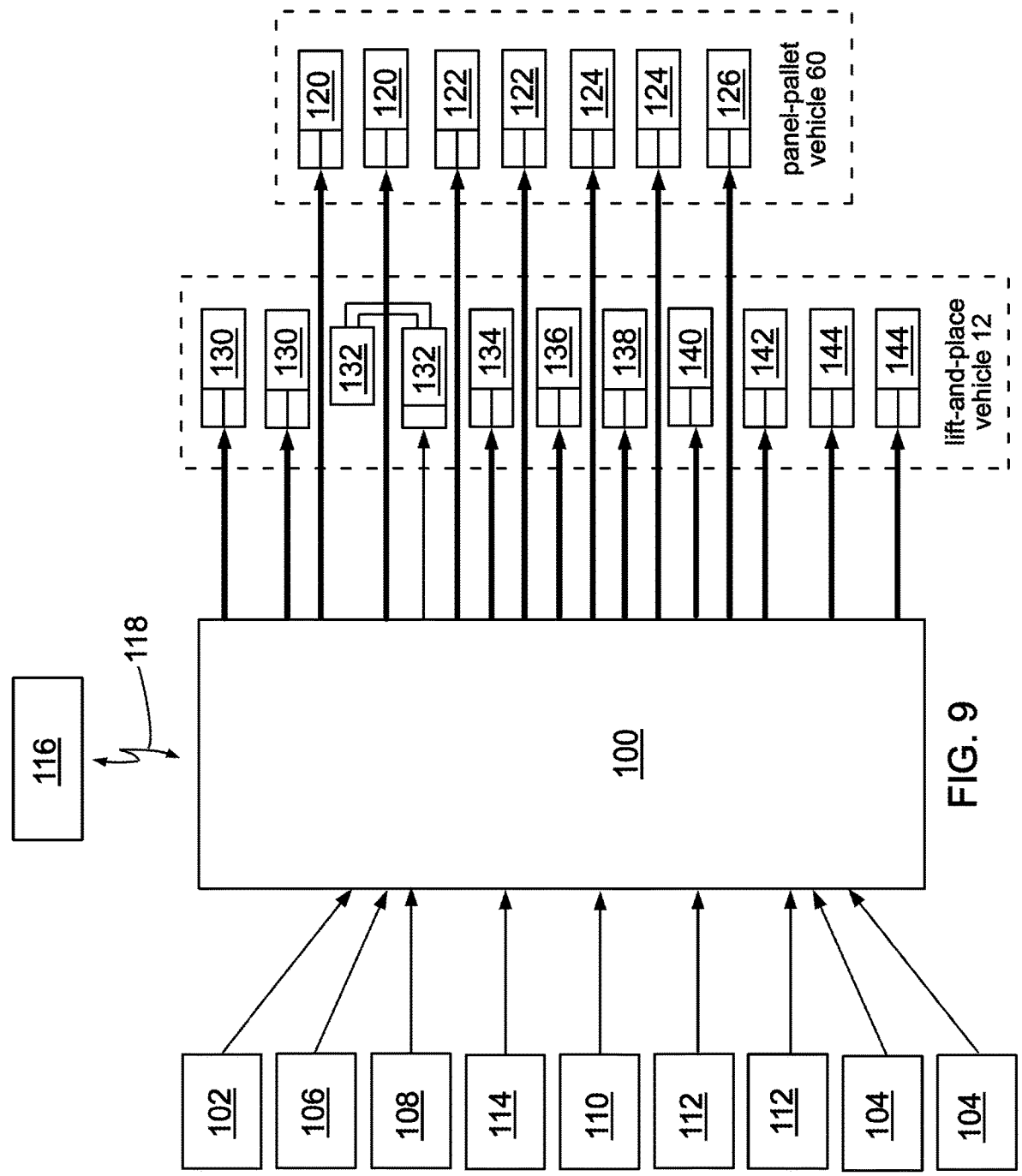
FIG. 9 is a schematic block diagram of an embodiment of the controller showing sensors and the user interface unit providing input signals and hydraulic elements receiving control signals from the controller.

FIG. 9 is a high-level schematic block diagram of the electrical signal flow within controller 100, including: a wireless user interface unit 116 wirelessly connected to controller 100 via a wireless link 118; a variety of sensors; and the solenoids which trigger the actuation of the hydraulic cylinders and drive motors within apparatus 10. In addition to optical position sensor 102 and two rotational position sensors 112 previously mentioned, the sensors include: two collision-avoidance sensors 104 mounted on driver 16 providing feedback to controller 16 of the presence of people or objects to avoid; a 2D incline sensor 106 on turret 15 measuring the orientation of turret 15 with respect to gravity; a 1D incline sensor 108 on mast 20 measuring the angle between mast 20 with respect to gravity; a trolley position sensor 110 measuring the position of trolley 28 along trolley beam 26; and a beam height sensor 114 on mast 20 measuring the height of beam 26. Angle 40 (see FIG. 7) between mast 20 and turret 15 is computed from the signals from sensors 106 and 108. Note again that FIG. 7 illustrates the special case of the ground being level.

The hydraulic actuators (cylinders and drive motors) of vehicles 12 and 60 are shown in two dotted-line boxes as indicated. In addition to hydraulic drive motors 130 and 120 and hydraulic cylinders 132, apparatus 10 includes hydraulic cylinders for the following actions: two cylinders 122 for lifting forklift 64 on vehicle 60; two cylinders 124 for tilting forklift 64 on vehicle 60; a cylinder 126 to actuate steering of vehicle 60 using panel-pallet steering wheels 70; a cylinder 134 for the telescoping action of mast 20; a cylinder 136 for the tilting motion of mast 20; a cylinder 138 to rotate turret 15 (and thus mast 20) with respect to driver 16; a cylinder 140 to drive trolley 28 along trolley beam 26 through a cable and pulleys; cylinder 142 for rotating trolley beam 26 with respect to mast upper portion 20u for transport and storage; and two cylinders 144 for rotating panel-support rotatable lips between orientations 36 and 38.

Optical position sensor 102 and collision avoidance sensors 104 may be LiDAR (light detection and ranging) devices such as the Model TIM351-2134001 sensor manufactured by SICK AG of Waldkirch, Germany. Rotational position sensors 112 may be Model IF5662 inductive sensors manufactured by IFM Efector, Inc. of Malvern, Pennsylvania, United States. Sensors 106 and 108 may be Model TMM55E-P0H045 2D inclination sensors manufactured by SICK AG. Controller 100 may use only a signal from one of the two incline axes of sensor 108. Trolley position sensor 110 and beam height sensor 114 may be Model DT35-B15251 mid-range distance sensors also manufactured by SICK AG.

All hydraulic actuators (motors and cylinders), with the exception of hitch cylinders 132, include two solenoids to control the direction of actuation thereof. In the schematic of FIG. 9, this two-solenoid configuration is indicated by the two small rectangles on the left side of each representative actuator symbol. Such configurations are well-known to those skilled in the area of hydraulic systems and thus further detail need not be described here. As described above, hitch cylinders 132 are configured differently. As alluded to above and as indicated in the schematic, cylinders 132 are directly connected such that hydraulic fluid flows between cylinders 132 when their single control solenoid-controlled valve is "open," allowing vehicle 60 freely to effect tight turns, but when the single control solenoid valve is "closed," both cylinder 132 are locked in position which allows steering and lift-and-place vehicle 12 to steer panel-pallet vehicle along generally straight paths in a more stable fashion.

Controller 100 includes at least a CPU with volatile memory, non-volatile memory for program storage, and suitable interface elements for communication with the sensors, solenoids on hydraulic actuators, and user interface unit 116 and wireless link 118. Controller 100 is programmable, and the program thereof includes at least one predetermined frequently-used movement of one or more portions of apparatus 10. For example, apparatus 10 may lift solar panels 32, manually loaded on carrier 60, up and out of the way of workers and other objects, move loaded carrier 60 right or left, as commanded, to the position over and along support structure 50 required for release, and lower carrier 60 to a height above support structure 50 suitable for release, all in an automatic fashion, thereby facilitating efficient installation of panels 32 in solar farms.

Turret 15 includes a number of system elements of apparatus 10 which are well-known to those skilled in the area of this invention and thus have not been discussed herein. These include, for example, an engine driving a hydraulic pump, one or more hydraulic manifolds, and various cooling, fuel storage, and other related system components.

While the principles of this invention have been described in connection with specific embodiments, it should be understood clearly that these descriptions are made only by way of example and are not intended to limit the scope of the invention.

The invention claimed is:

1. Apparatus for use in installation of an array of solar panels arranged in parallel rows on support structure, the installation apparatus comprising:
   a lift-and-place vehicle powered to move between and along adjacent rows of the support structure and including:
      a base having a ground-engaging driver for movement along the ground;
      a lifting mast secured with respect to the base, extending upwardly and in a fore/aft direction to define a panel-loading space;
      a liftable trolley beam secured to the mast over the panel-loading space and extending laterally to span between the adjacent rows;
      a traversing trolley movable along the trolley beam; and
      a panel-placing carrier suspended from the trolley for up/down and lateral movement of panels carried thereby, and
   a panel-pallet vehicle removably hitched to the lift-and-place vehicle, extending under the panel-loading space, and having a pallet carrier adjacent to the panel-loading space.

2. The solar-panel installation apparatus of claim 1 wherein the mast telescopes whereby the mast lifts and lowers the trolley beam, the trolley thereon, and the panel-placing carrier.

3. The solar-panel installation apparatus of claim 1 wherein the mast has a main portion extending upwardly from the base to an upper portion extending from the main portion to a position over the panel-loading space.

4. The solar-panel installation apparatus of claim 3 wherein the main portion of the mast telescopes whereby the mast lifts and lowers the trolley beam, the trolley thereon, and the panel-placing carrier.

5. The solar-panel installation apparatus of claim 1 wherein the mast is rotatably secured with respect to the base for lateral tilting of the mast to control the angle of the trolley beam with respect to the ground.

6. The solar-panel installation apparatus of claim 1 wherein the mast is rotatably secured with respect to the base for rotation of the mast around a substantially vertical axis to control the angle of the trolley beam with respect to the fore/aft direction.

7. The solar-panel installation apparatus of claim 6 wherein the base further includes a turret rotatably mounted on the ground-engaging driver, and the mast is mounted to the turret.

8. The solar-panel installation apparatus of claim 7 wherein the mast has a main portion extending upwardly from the base to an upper portion extending from the main portion to a position over the panel-loading space.

9. The solar-panel installation apparatus of claim 8 wherein the main portion of the mast telescopes whereby the mast lifts and lowers the trolley beam, the trolley thereon, and the panel-placing carrier.

10. The solar-panel installation apparatus of claim 1 wherein the trolley beam extends laterally beyond the distance between adjacent rows of support structure.

11. The solar-panel installation apparatus of claim 1 wherein the panel-placing carrier includes panel supports for a pair of opposing edges of solar panels, the panel supports movably controlled between panel-supporting and panel-releasing orientations.

12. The solar-panel installation apparatus of claim 11 wherein the panel supports are configured to support left and right edges of solar panels, each panel support having a rotatable lip configured to be movably controlled between the panel-supporting and panel-releasing orientations.

13. The solar-panel installation apparatus of claim 1 further including a controller having a user interface unit for controlling electrical and hydraulic functions of the solar-panel installation apparatus.

14. The solar-panel installation apparatus of claim 13 wherein the controller is a programmable controller having at least one predetermined frequently-used movement of one or more portions of the apparatus programmed therein.

15. The solar-panel installation apparatus of claim 13 wherein the controller further includes a wireless link to the user interface unit.

16. The solar-panel installation apparatus of claim 1 wherein the ground-engaging driver includes tracks driven by drive wheels.

17. The solar-panel installation apparatus of claim 1 wherein the panel-pallet vehicle is configured to support the panel-placing carrier during loading of panels thereon.

18. The solar-panel installation apparatus of claim 1 wherein the pallet carrier includes a forklift mechanism for engaging, lifting and carrying a pallet.

19. The solar-panel installation apparatus of claim 18 further including hydraulic and electrical tethers between the lift-and-place vehicle and the panel-pallet vehicle such that the panel-pallet vehicle is independently movable and steerable along the ground while unhitched from the lift-and-place vehicle.

20. The solar-panel installation apparatus of claim 1 wherein the removable hitching includes a hitching connection comprising two laterally-displaced hydraulic cylinders between the vehicles and rotatably attached to at least one of the vehicles, wherein the hydraulic cylinders are configured to be locked for fore/aft vehicle movement and unlocked for tight turning.

21. The solar-panel installation apparatus of claim 1 wherein the trolley beam is rotatably secured to the mast such that the trolley beam can be placed in a substantially fore/aft orientation to facilitate transport and storage.

22. The solar-panel installation apparatus of claim 1 further including an optical sensor mounted on the panel-placing carrier to facilitate placement of the solar panels on the support structure.

23. The solar-panel installation apparatus of claim 1 further including one or more collision avoidance sensors.

24. A lift-and-place vehicle for use in installation of an array of solar panels arranged parallel in rows on support structure, the vehicle powered to move between and along adjacent rows of the support structure and including:
   a base having a ground-engaging driver for movement along the ground;
   a lifting mast secured with respect to the base, extending upwardly and in a fore/aft direction to define a panel-loading space;
   a liftable trolley beam secured to the mast over the panel-loading space and extending laterally to span between the adjacent rows;
   a traversing trolley movable along the trolley beam; and
   a panel-placing carrier suspended from the trolley for up/down and lateral movement of panels carried thereby.

* * * * *